(12) United States Patent
Malladi et al.

(10) Patent No.: US 10,515,006 B2
(45) Date of Patent: Dec. 24, 2019

(54) PSEUDO MAIN MEMORY SYSTEM

(71) Applicant: Samsung Electronics Co., Ltd., Suwon-si, Gyeonggi-do (KR)

(72) Inventors: Krishna T. Malladi, San Jose, CA (US); Jongmin Gim, San Jose, CA (US); Hongzhong Zheng, Los Gatos, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 6 days.

(21) Appl. No.: 15/663,619

(22) Filed: Jul. 28, 2017

(65) Prior Publication Data

US 2018/0032430 A1    Feb. 1, 2018

Related U.S. Application Data

(63) Continuation-in-part of application No. 15/282,848, filed on Sep. 30, 2016, now Pat. No. 10,372,606.

(60) Provisional application No. 62/489,997, filed on Apr. 25, 2017, provisional application No. 62/368,775, filed on Jul. 29, 2016.

(51) Int. Cl.
  *G06F 12/02* (2006.01)
  *G06F 13/16* (2006.01)
  *G06F 12/121* (2016.01)

(52) U.S. Cl.
  CPC ........ *G06F 12/023* (2013.01); *G06F 13/1668* (2013.01); *G06F 12/121* (2013.01); *G06F 2212/251* (2013.01)

(58) Field of Classification Search
  CPC ........................... G06F 12/023; G06F 12/1668
  See application file for complete search history.

(56) References Cited

U.S. PATENT DOCUMENTS

| | | |
|---|---|---|
| 6,438,560 B1 | 8/2002 | Loen |
| 7,650,460 B2 | 1/2010 | Cheriton |
| 8,065,476 B2 | 11/2011 | Cheriton |
| 8,230,168 B2 | 7/2012 | Cheriton |
| 8,504,791 B2 | 8/2013 | Cheriton et al. |
| 8,612,673 B2 | 12/2013 | Cheriton |
| 8,832,531 B2 | 9/2014 | Shalvi et al. |
| 8,938,580 B2 | 1/2015 | Cheriton |
| 9,021,203 B2 | 4/2015 | Hyde, II et al. |

(Continued)

OTHER PUBLICATIONS

Magenheimer, Dan, Frontswap, Apr. 9, 2012, https://www.kernel.org/doc/Documentation/vm/frontswap.txt (Year: 2012).*

(Continued)

*Primary Examiner* — Ryan Bertram
*Assistant Examiner* — Edmund H Kwong
(74) *Attorney, Agent, or Firm* — Lewis Roca Rothgerber Christie LLP

(57) ABSTRACT

A pseudo main memory system. The system includes a memory adapter circuit for performing memory augmentation using compression, deduplication, and/or error correction. The memory adapter circuit is connected to a memory, and employs the memory augmentation methods to increase the effective storage capacity of the memory. The memory adapter circuit is also connected to a memory bus and implements an NVDIMM-F or modified NVDIMM-F interface for connecting to the memory bus.

19 Claims, 4 Drawing Sheets

(56) References Cited

U.S. PATENT DOCUMENTS

| | | | |
|---|---|---|---|
| 9,087,021 | B2 | 7/2015 | Magenheimer et al. |
| 9,164,903 | B2 | 10/2015 | Sarta |
| 9,336,129 | B2 | 5/2016 | Bennett et al. |
| 9,501,421 | B1 | 11/2016 | Cheriton |
| 9,520,193 | B2 | 12/2016 | Cheriton |
| 2006/0069879 | A1* | 3/2006 | Inoue ............... G06F 13/28 711/147 |
| 2010/0161909 | A1 | 6/2010 | Nation et al. |
| 2011/0145486 | A1* | 6/2011 | Owa ............... G06F 12/0246 711/103 |
| 2013/0275699 | A1 | 10/2013 | Cheriton |
| 2014/0208041 | A1 | 7/2014 | Hyde et al. |
| 2015/0006805 | A1 | 1/2015 | Feekes et al. |
| 2015/0074339 | A1 | 3/2015 | Cheriton |
| 2015/0081649 | A1 | 3/2015 | Kim et al. |
| 2015/0220354 | A1 | 8/2015 | Nair |
| 2016/0179375 | A1 | 6/2016 | Kirvan et al. |
| 2016/0179383 | A1 | 6/2016 | Krithivas et al. |
| 2016/0291891 | A1 | 10/2016 | Cheriton |
| 2017/0010817 | A1* | 1/2017 | Lim ............... G06F 3/0604 |
| 2017/0109049 | A1 | 4/2017 | Cheriton |

OTHER PUBLICATIONS

Superuser, StackExchange Is there a command to find out the available memory in Windows? 2014, https://superuser.com/questions/315195/is-there-a-command-to-find-out-the-available-memory-in-windows (Year: 2014).*

Magenheimer, Dan, Cleancache, 2011, https://www.kernel.org/doc/Documentation/vm/cleancache.txt (Year: 2011).*

Cheriton, David, et al., "HICAMP: Architectural Support for Efficient Concurrency-safe Shared Structured Data Access", ASPLOS XVII Proceedings of the seventeenth international conference on Architectural Support for Programming Languages and Operating Systems, Mar. 3-7, 2012, pp. 287-300.

Litz, Heiner, et al., "Fine-grain Memory Deduplication for In-Memory Database Systems", Stanford University, 2013, 22 pages.

Kim, Yoongu, "HICAMP: Architectural Support for Efficient Concurrency-Safe Shared Structured Data Access—Cheriton et al.,", ASPLOS 2012; Nov. 18, 2013 (43 pages).

Stevenson, John Peter; "Fine-Grain In-Memory Deduplication for Large-Scale Workloads"; A Dissertation Submitted to the Department of Electrical Engineering and the Committee on Graduate Studies of Stanford University in Partial Fulfillment of the Requirements for the Degree of Doctor of Philosophy; http://purl.stanford.edu/rp831pj6163; Dec. 2013 (140 pages).

* cited by examiner

PSEUDO MAIN MEMORY SYSTEM

CROSS-REFERENCE TO RELATED APPLICATION(S)

The present application claims priority to and the benefit of U.S. Provisional Application No. 62/489,997, filed Apr. 25, 2017, entitled "PSEUDO MAIN MEMORY SYSTEM", and is a continuation-in-part of U.S. patent application Ser. No. 15/282,848, filed Sep. 30, 2016, entitled "SYSTEM AND METHOD FOR INTEGRATING OVERPROVISIONED MEMORY DEVICES", which claims the benefit of U.S. Provisional Application No. 62/368,775 filed Jul. 29, 2016, the entire content of each of which is incorporated herein by reference.

FIELD

One or more aspects of embodiments according to the present invention relate to data storage, and more particularly to a system for storing data using memory augmentation.

BACKGROUND

Some modern applications such as databases, virtual desktop infrastructure, and data analytics may have a large main memory footprint. As systems scale out, such capacity needs increase super-linearly.

Thus, there is a need for a system and method of providing greater storage capacity.

SUMMARY

Aspects of embodiments of the present disclosure are directed toward a pseudo main memory system. The system includes a memory adapter circuit for performing memory augmentation using compression, deduplication, and/or error correction. The memory adapter circuit is connected to a memory, and employs the memory augmentation methods to increase the effective storage capacity of the memory. The memory adapter circuit is also connected to a memory bus and implements a non-volatile dual in-line memory module (NVDIMM) with flash memory (NVDIMM-F), or modified NVDIMM-F, interface for connecting to the memory bus.

According to an embodiment of the present invention there is provided a computing system, including: a central processing unit; and a memory system including: a memory adapter circuit; and a first memory, the memory adapter circuit having a first memory interface connected to the central processing unit and a second memory interface connected to the first memory, the first memory interface being a double data rate synchronous dynamic random-access memory interface, and the memory adapter circuit being configured to store data in, and retrieve data from, the first memory, utilizing augmentation of the storage capacity of the first memory.

In one embodiment, the augmentation includes at least one of: compression; deduplication; and error correction.

In one embodiment, the first memory interface is a second generation or higher generation double data rate synchronous dynamic random-access memory interface.

In one embodiment, the second memory interface is a second generation or higher generation double data rate synchronous dynamic random-access memory interface.

In one embodiment, the first memory interface is an NVDIMM-F interface, and the computing system is configured to operate the memory system as a block device.

In one embodiment, the central processing unit is connected to the memory adapter circuit through a memory management circuit.

In one embodiment, the first memory is a dynamic random-access memory and the second memory interface is a second generation or higher generation double data rate synchronous dynamic random-access memory interface.

In one embodiment, the memory adapter circuit is a single integrated circuit configured to perform: compression; deduplication; and error correction.

In one embodiment, the computing system includes a second memory connected to the central processing unit through a memory management circuit.

In one embodiment, the second memory is connected to the memory management circuit through a third memory interface, the third memory interface being a second generation or higher generation double data rate synchronous dynamic random-access memory interface.

In one embodiment, the central processing unit is configured to maintain a page cache in the second memory, and the central processing unit is configured to call a cleancache function for clean pages when evicting the clean pages from the page cache, the cleancache function being configured to store the clean pages: in the first memory when sufficient space is available in the first memory; and in persistent storage otherwise.

In one embodiment, the cleancache function is configured to assess whether sufficient space is available in the first memory based on an estimated augmentation ratio, the estimated augmentation ratio being a function of augmentation ratios for data stored in the first memory over a set interval of time.

In one embodiment, the central processing unit is configured to maintain a user memory space in the second memory, and the central processing unit is configured to call a frontswap function for dirty pages when evicting the dirty pages from the user memory space, the frontswap function being configured to store the dirty pages: in the first memory when sufficient space is available in the first memory; and in persistent storage otherwise.

In one embodiment, the frontswap function is configured to assess whether sufficient space is available in the first memory based on an estimated augmentation ratio, the estimated augmentation ratio being a function of augmentation ratios for data stored in the first memory over a set interval of time.

In one embodiment, the central processing unit is configured to: execute one or more applications, and in response to an application of the one or more applications to a sysinfo function, return: a value for the total available memory based on the size of the first memory and size of the second memory, and a value for the total free memory based on the amount of free memory in the first memory and the amount of free memory in second memory.

In one embodiment, the value for the total free memory is the sum of an amount of free memory in the second memory, and the product of a minimum augmentation ratio and an amount of free memory in the first memory, the minimum augmentation ratio being: a function of augmentation ratios for data stored in the first memory over a set interval of time when the set interval has elapsed since system startup, and 2.0 otherwise.

According to an embodiment of the present invention there is provided a method for operating a computer system, the computer system including: a central processing unit; and a memory system including: a memory adapter circuit; and a first memory, the memory adapter circuit having a first memory interface connected to the central processing unit and a second memory interface connected to the first memory, the first memory interface being a double data rate synchronous dynamic random-access memory interface, and the method including storing data in, and retrieving data from, the first memory, utilizing augmentation of the storage capacity of the first memory.

In one embodiment, the augmentation includes at least one of: compression; deduplication; and error correction.

In one embodiment, the method includes using the memory system as a block device operable with an NVDIMM-F protocol.

In one embodiment, the memory adapter circuit is a single integrated circuit configured to perform: compression; deduplication; and error correction.

According to an embodiment of the present invention there is provided a computing system, including: a central processing unit; and a memory system including: a first memory; and memory adapter means for storing data in, and retrieving data from, the first memory, utilizing augmentation of the storage capacity of the first memory, the memory adapter means having a first memory interface connected to the central processing unit and a second memory interface connected to the first memory, the first memory interface being an NVDIMM-F interface, and the computing system being configured to operate the memory system as a block device.

BRIEF DESCRIPTION OF THE DRAWINGS

These and other features and advantages of the present invention will be appreciated and understood with reference to the specification, claims, and appended drawings wherein:

DETAILED DESCRIPTION

The detailed description set forth below in connection with the appended drawings is intended as a description of exemplary embodiments of a pseudo main memory system provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

In some embodiments an efficient pseudo-memory mechanism to deploy inline memory augmentation by compression and/or deduplication and/or error-correction which may be referred to as "memory ABCDE". Such systems may dramatically increase the memory density while relying on hardware techniques completely local to the memory system. Challenges for memory ABCDE systems include integration on a double data rate synchronous dynamic random-access memory (DDR) bus and the management of the variable memory density that such systems may provide (e.g., memory density that changes with application data or external conditions (e.g., external conditions that may affect errors)). Further, some applications may not be written to explicitly use the additional capacity provided by a memory ABCDE system. In some embodiments the system provides simulated system memory capacity to enable user space applications to address a large capacity of memory.

In some embodiments the operating system is aware of the physical organization and capacity of the underlying memory and performs relevant operations to mask these details from the applications. Beneath the user space, the operating system memory management unit (MMU) (or "memory management circuit") reuses the transcendent memory feature present in the LINUX™ kernel to expose a memory ABCDE system as a fast-swap block device on a DDR interface (e.g., a fourth-generation DDR (DDR4) interface).

Figure 1:
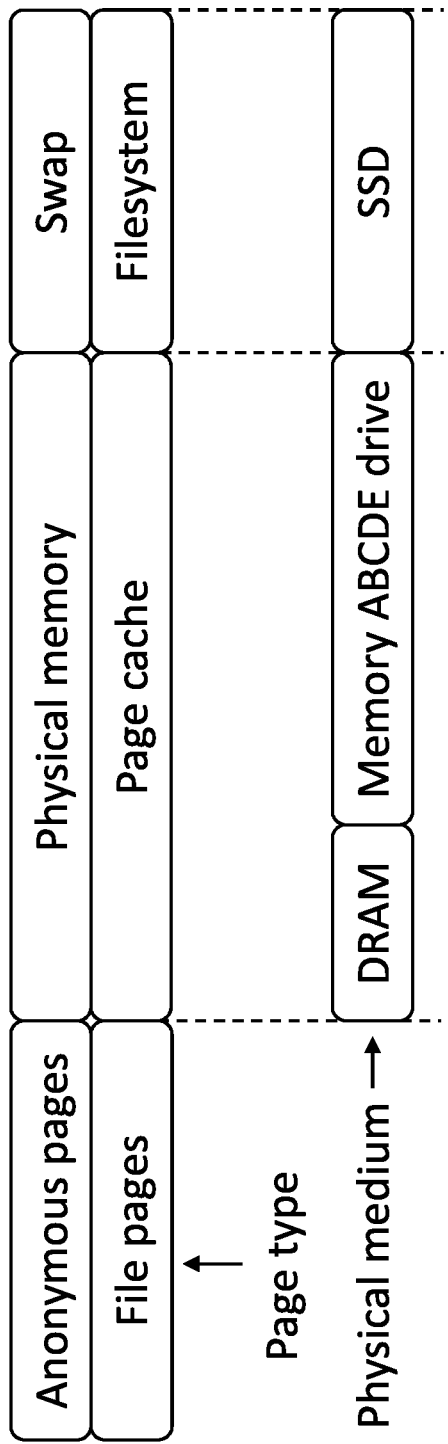
FIG. 1 is a block diagram of a system memory hierarchy, according to an embodiment of the present invention.

FIG. 1 shows a system memory hierarchy using a memory ABCDE system as pseudo main memory according to one embodiment. The memory ABCDE system may be referred to as a memory ABCDE "drive" because it may operate as a block device.

Figure 2:
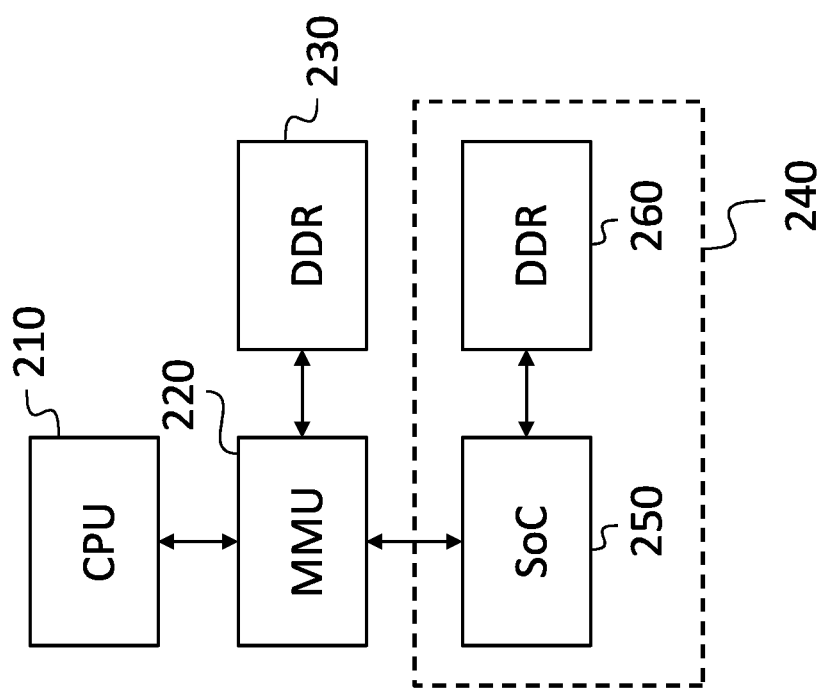
FIG. 2 is a hardware block diagram of a computing system, according to an embodiment of the present invention.

FIG. 2 shows a hardware block diagram of a computing system according to one embodiment. In some embodiments, a computing system using a memory ABCDE system may include the following three components. First, it may include a memory ABCDE system 240 based on a non-volatile dual in-line memory module (NVDIMM) with flash memory (NVDIMM-F) form factor and interface (e.g., in FIG. 2, the interface between the memory ABCDE system 240 and the memory management circuit 220). NVDIMM-F memory may have attributes in common with a memory ABCDE system, because, for example both may exhibit variable storage density. Second, it may use a software infrastructure based on transcendent memory. This infrastructure may include a driver, referred to as the memory ABCDE driver, used by the operating system to access the memory ABCDE system. Third, it may employ modified system functions (e.g., a modified sysinfo( ) function) to simulate increased main memory capacity.

The NVDIMM-F protocol may be employed, in related art applications, for populating flash modules on a DDR memory bus. Such an application may enable block access with long access latency, using an interface (i.e., the DDR interfacer) that only supports short access bursts with 64-byte cache lines. In such an application, the address space may be sufficiently large that the DDR command bus cannot post a logical block address (LBA) within its pin limits. Accordingly, the NVDIMM-F interface relies on the DRAM data bus to send commands (including addresses) to flash modules.

In some embodiments, the NVDIMM-F protocol is instead employed to include access to a dynamic random-access memory (DRAM)-based memory ABCDE system to provide block access. In some embodiments, because a memory ABCDE system may have lower capacity than flash-based systems, the NVDIMM-F protocol may be modified to use the command and address bus (instead of the data bus) for commands and addresses. In such an embodiment, the address is written on the command and address bus (by the memory ABCDE driver), thereby directly accessing a memory location (instead of writing the address itself in a small buffer, as in the unmodified NVDIMM-F protocol).

In some embodiments the system ensures that read and write commands to the ABCDE memory system are uncached, and are therefore sent directly to the memory ABCDE system instead of waiting to be flushed from the central processing unit (CPU) cache. To accomplish this, the memory ABCDE driver uses a flush cache line (e.g., CLFLUSH) CPU instruction and a flush-on-demand (e.g., PCOMMIT) CPU instructions to ensure the commands reach the ABCDE module. In addition, an efficient memory-memory direct memory access (DMA) engine in the memory ABCDE system may be employed to transfer the data from block based internal pages in the memory ABCDE system to the DDR4 bus of the computing system, for quickly migrating pages back and forth between main memory and the memory ABCDE system.

In the embodiment of FIG. 2, a central processing unit 210 communicates through a memory management circuit 220 with (i) a main memory 230 (which may be DDR memory, e.g., DDR4 memory or in other embodiments other memory configured to be connected to a second generation or higher generation double data rate synchronous dynamic random-access memory interface (e.g., DDR2, DDR3, DDR4, or DDR5 memory)). The memory management circuit 220 is also connected to a memory ABCDE system 240 that includes a memory adapter circuit 250 and an intermediate memory 260 (referred to as an "intermediate memory" because its role may be considered to be intermediate to that of the main memory 230 and that of a persistent storage device, e.g., a solid state drive (SSD)).

The memory adapter circuit 250 may be a system on a chip (SoC), e.g., it may be a single integrated circuit including a processor, memory (for storing programs and data for the processor) and other logic and drive circuitry. The memory adapter circuit 250 may have a first memory interface (e.g., a DDR4 interface) through which it is connected (e.g., through a DDR bus) to the memory management circuit 220 and a second memory interface through which it is connected to the intermediate memory 260. The second memory interface may be any suitable interface with which the intermediate memory 260 is compatible (e.g., a DDR4 interface if the intermediate memory 260 is DDR4 memory). The memory adapter circuit 250 may implement, at the first memory interface, an NVDIMM-F protocol, or a modified NVDIMM-F protocol (the latter transmitting addresses on the control and address bus instead of on the data bus), as described above.

The memory adapter circuit 250 is, in some embodiments, further configured to provide memory augmentation by one or more of compression, deduplication, and error correction. For example, the memory adapter circuit 250 may compress data received from the memory management circuit 220 and store the compressed data in the intermediate memory 260, and, upon request from the memory management circuit 220, it may fetch the compressed data from the intermediate memory 260, de-compress it, and send it to the memory management circuit 220. Similarly, it may eliminate duplicate data from the data stored in the intermediate memory 260 (and restore the duplicate entries when data, which originally contained duplicate entries, is requested by the memory management circuit 220), and it may encode data with error-correcting codes before storing the data in the intermediate memory 260, and perform error correction on any data it retrieves from the intermediate memory 260.

Figure 3:
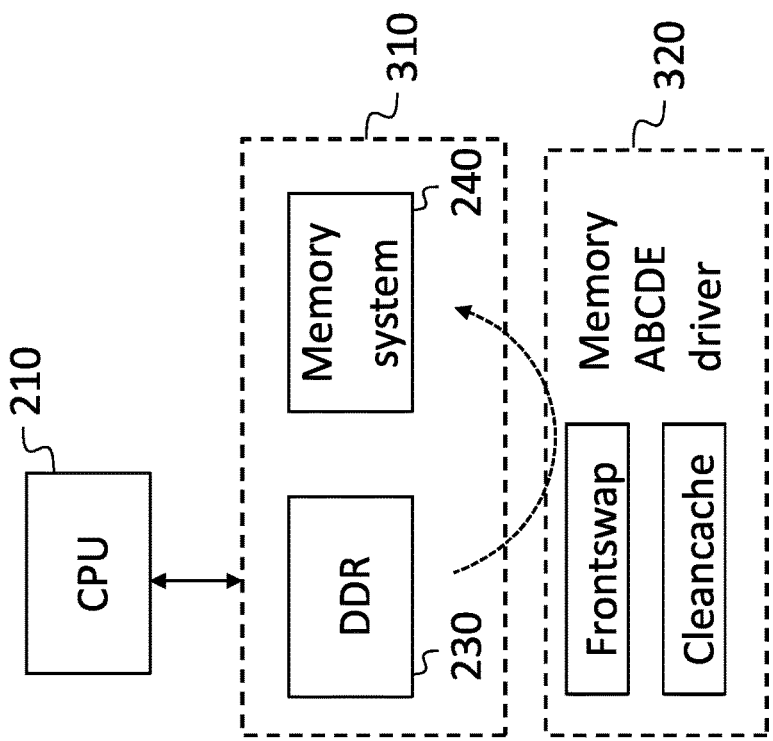
FIG. 3 is a hybrid hardware software block diagram of a computing system, according to an embodiment of the present invention.

FIG. 3 shows a hybrid hardware-software block diagram according to some embodiments. The central processing unit 210 has access to a conglomerate memory 310 including the main memory 230 and the memory ABCDE system 240. At boot-up, instructions in the basic input/output system (BIOS) register an address range on the DDR bus to the memory ABCDE system, disable address interleaving for the address range, and designate the address range as corresponding to a block device. The memory ABCDE system 240 is registered as a block device because (i) some of its operations, such as compressing and decompressing data, may be better suited to block access than to individual word access and (ii) so that the central processing unit 210 will not inappropriately rely on its behaving as a synchronous DDR memory.

In some embodiments, when the operating system is loaded, the memory ABCDE driver 320 registers and implements a frontswap function and a cleancache function. These functions are called by the transcendent memory feature of the LINUX' kernel, if this feature is present and enabled in the LINUX™ kernel. The transcendent memory feature may intercept kernel operations to evict (i) clean cache pages or (ii) dirty user pages and make calls to the cleancache and frontswap functions of the memory ABCDE driver 320. For example, when a clean cache page is evicted, the transcendent memory feature may intercept the eviction operation and call the cleancache function, which may copy the page from the main memory 230 into the memory ABCDE system 240, from which it may subsequently be accessed by the central processing unit 210, or copied back into the main memory 230, more rapidly than if it had instead been deleted (so that subsequent access would require that it be restored from persistent storage, e.g., from an SSD or hard drive). When a dirty user page is evicted by the kernel, the transcendent memory feature may intercept the eviction operation and call the frontswap function, which may copy the dirty user page being evicted to the memory ABCDE system 240, an operation that may be completed more quickly than writing the page to persistent storage.

The memory ABCDE driver 320 may include methods for determining whether to accept or reject any write requests received by the memory ABCDE system 240. The memory ABCDE driver 320 may make this determination by multiplying the free space in the intermediate memory 260 by an estimated augmentation ratio and comparing the product to the amount of data in the write request. The estimated augmentation ratio may, for example, be an estimated deduplication ratio, i.e., an estimate of how much more data can be stored, as a result of using deduplication. In some embodiments, the memory ABCDE driver 320 is configured to produce an estimated augmentation ratio that is based on the actual augmentation ratio for completed write operations but that varies slowly with time, so that large fluctuations in the actual augmentation ratio (e.g., for write operations involving small amounts of data) do not result in large fluctuations in the estimated augmentation ratio. For example, the estimated augmentation ratio may be set to 1.0 at startup, and, after an interval of time of a set length has elapsed, it may be periodically updated to be equal to the average of the actual augmentation ratio over the time interval having the set length and ending at the present.

End users and application frameworks may be specifically designed to avoid using non-paged memory, because other non-paged memory systems may reside in the secondary storage (e.g., in persistent storage) and may have long access latencies. Because in some embodiments, the memory ABCDE system 240 provides non-paged memory, this may result in such applications needlessly foregoing the benefits of the memory ABCDE system 240. One possible solution may be for developers to rewrite application libraries and middleware frameworks, but this would pose a significant challenge, involving modifications to a large number of existing frameworks.

Figure 4:
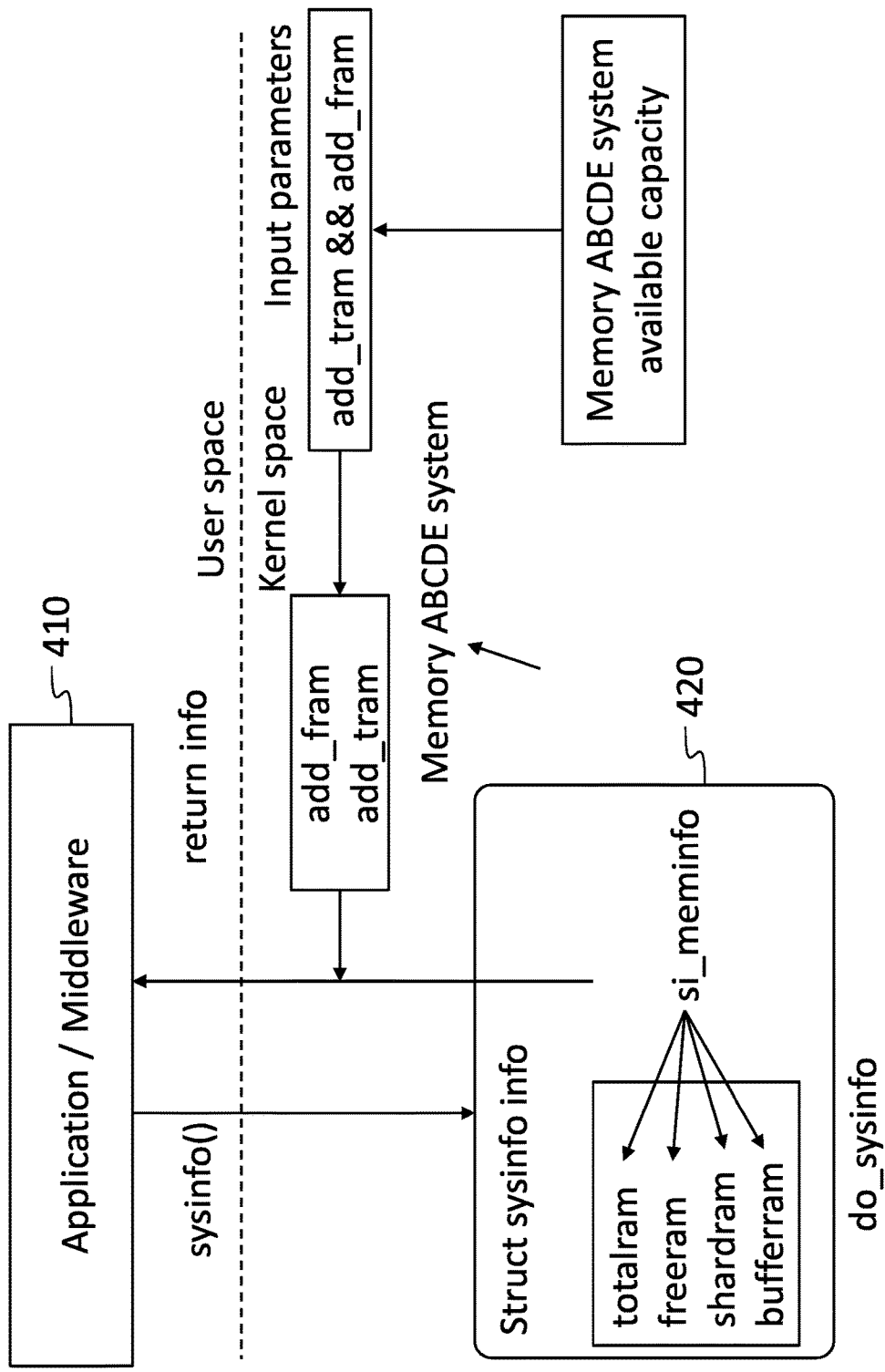
FIG. 4 is a software block diagram of a system for modifying a response to a sysinfo function call, according to an embodiment of the present invention.

Accordingly, in some embodiments, the kernel may be modified to allow the memory ABCDE system 240 to simulate main memory for purposes of responses to system calls, such as calls to the sysinfo function. Referring to FIG. 4, in some embodiments, when an application 410 or middleware makes a call to sysinfo, the structure 420 that is returned may include (i) a value for total available memory ("tram" in FIG. 4) that is based on the size of the main memory 230 and the size of the intermediate memory 260, and (ii) a value for total free memory that is based on the amount of free memory in the main memory 230 and the amount of free memory in the intermediate memory 260.

The amount by which the total memory and free memory information is increased to account for storage in the intermediate memory 260 may take into account the expected augmentation ratio for data to be stored in the intermediate memory 260. In some embodiments, the value for total free memory returned is equal to the sum of (i) the amount of free memory in the main memory 230 and (ii) the product of (1) an estimated augmentation ratio and (2) the amount of free memory in the intermediate memory 260. The estimated augmentation ratio may be calculated as described above, or it may be calculated according to a conservative algorithm (to result in an estimate that may be referred to as the "minimum augmentation ratio"), e.g., by using the value 1.0 at system startup or when data upon which to base a meaningful estimate is otherwise unavailable. When data upon which to base a meaningful estimate is available, the estimated augmentation ratio may be calculated using, e.g., the minimum actual augmentation ratio for completed write operations over an interval of time.

This approach may raise a further challenge, the implementation of the mlock( ) system function. This system function is designed, when called, to pin or lock a specific amount of memory, starting at a virtual address to main memory, to avoid swapping it to secondary storage. In some embodiments, in operation, it may occur that part of this memory resides in the main memory 230 while the other part resides in the memory ABCDE system 240. To honor the user space request, the memory ABCDE driver may therefore be configured to ensure that the current pages in the memory ABCDE system remain locked in their place and to defer swapping them to secondary (e.g., persistent) storage.

In view of the foregoing, some embodiments provide a pseudo main memory system. The system includes a memory adapter circuit for performing memory augmentation using compression, deduplication, and/or error correction. The memory adapter circuit is connected to a memory, and employs the memory augmentation methods to increase the effective storage capacity of the memory.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" refers to a component that is present in a composition, polymer, or product in an amount greater than an amount of any other single component in the composition or product. In contrast, the term "primary component" refers to a component that makes up at least 50% by weight or more of the composition, polymer, or product. As used herein, the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present. When an intervening element is present between a first element connected to a second element, the first element may be said to be connected to the second element "through" the intervening element.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a pseudo main memory system have been specifically described and illustrated herein, many modifications and variations will be apparent to those skilled in the art. Accordingly, it is to be understood that a pseudo main memory system constructed according to principles of this invention may be embodied other than as specifically described herein. The invention is also defined in the following claims, and equivalents thereof.

What is claimed is:

1. A computing system, comprising:
a central processing unit;
a memory system comprising:
a memory adapter circuit; and
a first memory; and
a second memory connected to the central processing unit through a memory management circuit,
wherein the memory adapter circuit has a first memory interface connected to the central processing unit and a second memory interface connected to the first memory, the first memory interface being a double data rate synchronous dynamic random-access memory interface, and
wherein the memory adapter circuit is configured to store data in, and retrieve data from, the first memory, utilizing augmentation of a storage capacity of the first memory, the augmentation being configured to increase free memory of the first memory according to an augmentation ratio,
wherein the memory adapter circuit is further configured to estimate the augmentation ratio based on compression and/or deduplication of previous write operations, and
wherein the central processing unit is configured to maintain a page cache in the second memory,
wherein the central processing unit is configured to call a cleancache function for clean pages when evicting the clean pages from the page cache, the cleancache function being configured to store the clean pages:
in the first memory when sufficient space is available in the first memory; and
in persistent storage otherwise, and
wherein the central processing unit is further configured to assess whether sufficient space is available in the first memory based on an estimated augmentation ratio, the estimated augmentation ratio being a function of augmentation ratios for data stored in the first memory over a set interval of time.

2. The computing system of claim 1, wherein the augmentation comprises at least one of:
compression;
deduplication; and
error correction.

3. The computing system of claim 1, wherein the first memory interface is a second generation or higher generation double data rate synchronous dynamic random-access memory interface.

4. The computing system of claim 3, wherein the second memory interface is a second generation or higher generation double data rate synchronous dynamic random-access memory interface.

5. The computing system of claim 3, wherein the first memory interface is an NVDIMM-F interface, and the computing system is configured to operate the memory system as a block device.

6. The computing system of claim 1, wherein the central processing unit is connected to the memory adapter circuit through a memory management circuit.

7. The computing system of claim 1, wherein the first memory is a dynamic random-access memory and the second memory interface is a second generation or higher generation double data rate synchronous dynamic random-access memory interface.

8. The computing system of claim 1, wherein the memory adapter circuit is a single integrated circuit configured to perform:
compression;
deduplication; and
error correction.

9. The computing system of claim 1, wherein the second memory is connected to the memory management circuit through a third memory interface, the third memory interface being a second generation or higher generation double data rate synchronous dynamic random-access memory interface.

10. The computing system of claim 1, wherein the cleancache function is configured to assess whether sufficient space is available in the first memory based on the estimated augmentation ratio.

11. The computing system of claim 1, wherein the central processing unit is configured to maintain a user memory space in the second memory, and
the central processing unit is configured to call a frontswap function for dirty pages when evicting the dirty pages from the user memory space, the frontswap function being configured to store the dirty pages:
in the first memory when sufficient space is available in the first memory; and
in persistent storage otherwise.

12. The computing system of claim 11, wherein the frontswap function is configured to assess whether sufficient space is available in the first memory based on the estimated augmentation ratio.

13. The computing system of claim 1, wherein the central processing unit is configured to:
execute one or more applications, and
in response to an application of the one or more applications to a sysinfo function, return:
a value for a total available memory based on a size of the first memory and size of the second memory, and
a value for a total free memory based on an amount of the free memory in the first memory and an amount of free memory in the second memory.

14. The computing system of claim 13, wherein the value for the total free memory is a sum of
an amount of free memory in the second memory, and
a product of a minimum augmentation ratio and an amount of the free memory in the first memory, the minimum augmentation ratio being:
the function of augmentation ratios for data stored in the first memory over the set interval of time when the set interval of time has elapsed since system startup, and
2.0 otherwise.

15. A method for operating a computer system, the computer system comprising:
a central processing unit;
a memory system comprising:
a memory adapter circuit; and
a first memory; and
a second memory connected to the central processing unit through a memory management circuit,
the memory adapter circuit having-a first memory interface connected to the central processing unit and a second memory interface connected to the first memory,
the first memory interface being a double data rate synchronous dynamic random-access memory interface, and the method comprising storing data in, and retrieving data from, the first memory, utilizing augmentation of a storage capacity of the first memory, the augmentation being configured to increase free memory of the first memory according to an augmentation ratio, wherein the memory adapter circuit is configured to estimate the augmentation ratio based on compression and/or deduplication of previous write operations, and wherein the central processing unit is configured to maintain a page cache in the second memory, wherein the central processing unit is configured to call a cleancache function for clean pages when evicting the clean pages from the page cache, the cleancache function being configured to store the clean pages:
  in the first memory when sufficient space is available in the first memory; and
  in persistent storage otherwise, and wherein the central processing unit is further configured to assess whether sufficient space is available in the first memory based on an estimated augmentation ratio, the estimated augmentation ratio being a function of augmentation ratios for data stored in the first memory over a set interval of time.

16. The method of claim 15, wherein the augmentation comprises at least one of:
  compression;
  deduplication; and
  error correction.

17. The method of claim 15, comprising using the memory system as a block device operable with an NVDIMM-F protocol.

18. The method of claim 15, wherein the memory adapter circuit is a single integrated circuit configured to perform:
  compression;
  deduplication; and
  error correction.

19. A computing system, comprising:
a central processing unit;
a memory system comprising:
  a first memory; and
  memory adapter means for storing data in, and retrieving data from, the first memory, utilizing augmentation of a storage capacity of the first memory, the augmentation being configured to increase free memory of the first memory according to an augmentation ratio, the memory adapter means being configured to estimate the augmentation ratio based on compression and/or deduplication of previous write operations,
the memory adapter means having a first memory interface connected to the central processing unit and a second memory interface connected to the first memory,
the first memory interface being an NVDIMM-F interface, and
the computing system being configured to operate the memory system as a block device,
wherein the computing system further comprises:
  a second memory connected to the central processing unit through a memory management circuit,
  wherein the central processing unit is configured to maintain a page cache in the second memory,
  wherein the central processing unit is configured to call a cleancache function for clean pages when evicting the clean pages from the page cache, the cleancache function being configured to store the clean pages:
    in the first memory when sufficient space is available in the first memory; and
    in persistent storage otherwise, and
  wherein the central processing unit is further configured to assess whether sufficient space is available in the first memory based on an estimated augmentation ratio, the estimated augmentation ratio being a function of augmentation ratios for data stored in the first memory over a set interval of time.

* * * * *